United States Patent [19]

Earle et al.

[11] 3,925,624

[45] Dec. 9, 1975

[54] COUPLING CIRCUIT FOR PROVIDING BILATERAL PROTECTION FROM HAZARDOUS VOLTAGES

[75] Inventors: Harold Westly Earle, New Shrewsbury; Joseph Robbins, Marlboro, both of N.J.

[73] Assignee: Bell Telephone Laboratories, Incorporated, Murray Hill, N.J.

[22] Filed: Dec. 27, 1974

[21] Appl. No.: 536,732

[52] U.S. Cl. ............................... 179/81 R; 179/184

[51] Int. Cl.² ............................... H04M 1/00

[58] Field of Search ........ 179/81 R, 84 R, 184, 186; 317/16, 61.5; 340/248 C, 248 P, 253 P

[56] References Cited

UNITED STATES PATENTS

| | | | |
|---|---|---|---|
| 3,126,452 | 3/1964 | Pettersson | 179/81 R |
| 3,181,033 | 4/1965 | Bakker | 179/81 R |
| 3,558,830 | 1/1971 | Bender | 179/81 R |

*Primary Examiner*—Kathleen H. Claffy
*Assistant Examiner*—Joseph Popek
*Attorney, Agent, or Firm*—Roy C. Lipton

[57] ABSTRACT

A protective coupling circuit inserted between a telephone line and station equipment provides bilateral hazardous voltage protection which is normally removed in response to ringing signals on the telephone line. The hazardous voltage protection is not removed however if station generated voltages exceeding a predetermined amplitude are present when the ringing signals are received and, if removed, is reinstated in response to continuous voltages exceeding a predetermined amplitude originating from the station equipment or the telephone line.

14 Claims, 2 Drawing Figures

COUPLING CIRCUIT FOR PROVIDING BILATERAL PROTECTION FROM HAZARDOUS VOLTAGES

FIELD OF THE INVENTION

This invention relates to protective coupling circuits and more particularly to protective coupling circuits inserted between a telephone line and station equipment to provide bilateral protection from hazardous voltages.

DESCRIPTION OF THE PRIOR ART

It is known in the prior art to provide protective coupling circuits between a telephone line and station equipment requiring access to the telephone line. Such circuits are designed to insert a bilateral protective barrier between the station equipment and the telephone line such that the telephone line is protected from a.c. or d.c. hazardous voltages generated by the station equipment, and the station equipment is protected from a.c. or d.c. hazardous voltages originating from the telephone line. While providing the hazardous voltage protection, the coupling circuits also provide an a.c. signaling path between the station equipment and the telephone line to carry voice and ringing signals.

A known method of providing an a.c. signaling path and hazardous voltage protection is to transformer couple the station equipment to the telephone line and to place a voltage limiting device across the signaling path. The transformer provides d.c. hazardous voltage protection, while the voltage limiter reduces the amplitude of a.c. hazardous voltages to a safe level. To be effective, however, the voltage limiter should limit the amplitude of all a.c. voltages to a value less than normal ringing signals and therefore must be removed when ringing signals are received from the telephone central office. This is typically accomplished by detecting the presence of ringing signals on the telephone line and removing the voltage limiter from the coupling circuit in response thereto.

Removing the voltage limiter in response to ringing signals causes two problems. First, if a.c. hazardous voltages are being generated by the station equipment when ringing signals are received, removal of the voltage limiter allows this hazardous voltage to be connected directly to the telephone line. Second, an a.c. hazardous voltage present on the telephone line may appear to the coupling circuitry as a ringing signal, thereby resulting in the removal of the voltage limiter and the connection of the a.c. hazardous voltage directly to the station equipment.

It is therefore a broad object of this invention to provide bilateral hazardous voltage protection between a telephone line and station equipment.

It is a further object of this invention to provide the hazardous voltage protection in the presence of hazardous voltages on the telephone line which simulate ringing signals.

It is another object of this invention to provide the hazardous voltage protection in the presence of station generated hazardous voltages notwithstanding the occurrence of ringing signals on the telephone line.

An additional problem with certain types of answer-only station equipment, such as automatic answering devices, is the possibility that the station equipment will inadvertently go off-hook due to internal malfunctions rather than in response to ringing signals. Prior art coupling circuits go off-hook in response to this erroneous off-hook state of the station equipment, thereby signaling an off-hook condition to the telephone central office and unnecessarily tying up central office equipment.

It is therefore another object of this invention to prevent a coupling circuit from signaling an off-hook condition to the telephone central office in response to an erroneous off-hook state of the station equipment.

SUMMARY OF THE INVENTION

In accordance with a feature of the invention, the presence of station generated voltages exceeding a predetermined amplitude prevents the hazardous voltage protection existing between the telephone line and the station equipment from being removed in response to subsequently occurring ringing signals. Therefore, the protection barrier is maintained and the station generated voltages are blocked from the telephone line.

It is another feature of the invention that station generated voltages exceeding the predetermined amplitude occurring during the reception of ringing signals on the telephone line results in the reinstatement of the hazardous voltage protection previously removed in response to the ringing signals. Therefore, the station generated voltages are blocked from the telephone line.

A.C. voltages present on the telephone line may simulate ringing signals and result in the removal of the hazardous voltage protection. It is another feature of the invention that the presence of a.c. voltages on the telephone line at least equal in amplitude to the amplitude of the ringing signals and continuous for a predetermined interval of time will result in the reinstatement of the hazardous voltage protection. Alternatively, the hazardous voltage protection will also be reinstated if the station equipment draws a predetermined amount of current in response to the application of the a.c. voltage thereto.

It is another feature of the invention that a coupling circuit is rendered unresponsive to the off-hook condition of station equipment in response to the absence of ringing signals on the telephone line.

The foregoing and other objects and features will be more fully understood from the following description of an illustrative embodiment thereof in conjunction with the accompanying drawings.

DETAILED DESCRIPTION

Figure 1:
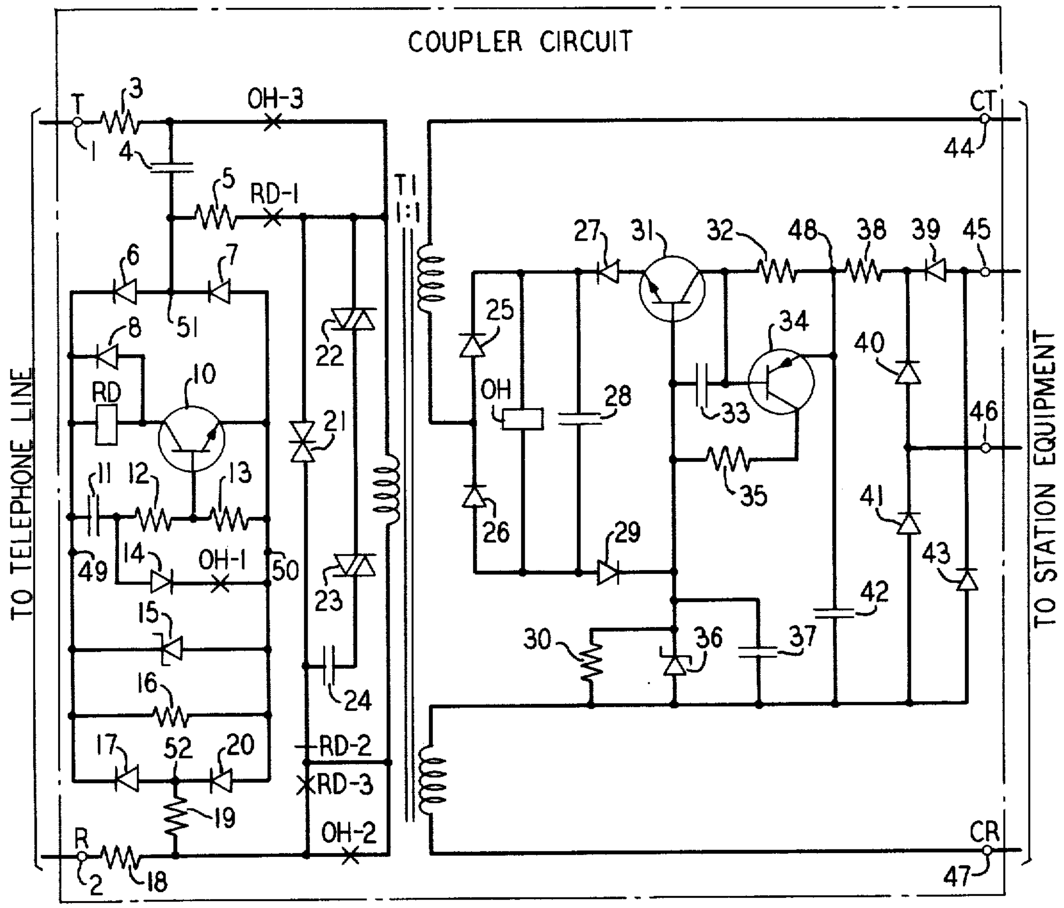
FIG. 1 discloses in schematic form the details of a coupler circuit arranged in accordance with this invention.

Refer to FIG. 1. Terminals 1 and 2 are connected to the telephone line. Terminals 44 and 47 are connected to the station equipment. For purposes of the following discussion the station equipment is assumed to be of the answer-only type. The invention described herein, however, is not limited to any particular type of station equipment. The coupler circuit in FIG. 1 is advantageously powered by a 20 volt a.c. power source or a 25 ±3 volt d.c. power source applied to terminals 45 and 46. Relay RD is the ring detection relay and operates when ringing is detected. Relay OH functions to detect the off-hook state of the station equipment and also operates when an a.c. voltage of sufficient amplitude is applied to customer terminals 44 and 47. Surge limiter 21 provides the primary protection against metallic a.c. voltages originating from either the telephone line or the station equipment. A metallic a.c. voltage is defined as an a.c. voltage appearing between terminals 1 and 2 or between terminals 44 and 47. Varistors 22 and 23 serve to limit voice frequency signals being transmitted through the coupling circuit. Transistors 10, 31 and 34 are normally biased in the OFF state. Protection against d.c. voltages and a.c. longitudinal voltages originating from either the telephone line or the station equipment is advantageously provided by transformer $T_1$. A longitudinal a.c. voltage is defined as any a.c. voltage appearing between any of terminals 1, 2, 44 or 47 and ground. The protection capabilities of transformer $T_1$ against d.c. and longitudinal a.c. hazardous voltages is obvious. Therefore, the remaining discussion will focus on the ability of the coupler circuit in FIG. 1 to protect against metallic a.c. hazardous voltages.

The 20 volt a.c. voltage applied to coupler terminals 45 and 46, is full-wave rectified by diodes 39, 40, 41, and 43 and filtered by resistor 38 and capacitor 42. The resultant d.c. voltage is applied to node 48. A d.c. voltage of either polarity applied between terminals 45 and 46 will also result in a d.c. voltage of positive polarity on node 48. This d.c. voltage has no effect until signals are present on terminals 1 and 2, or 44 and 47, as will be described hereinafter.

Figure 2:
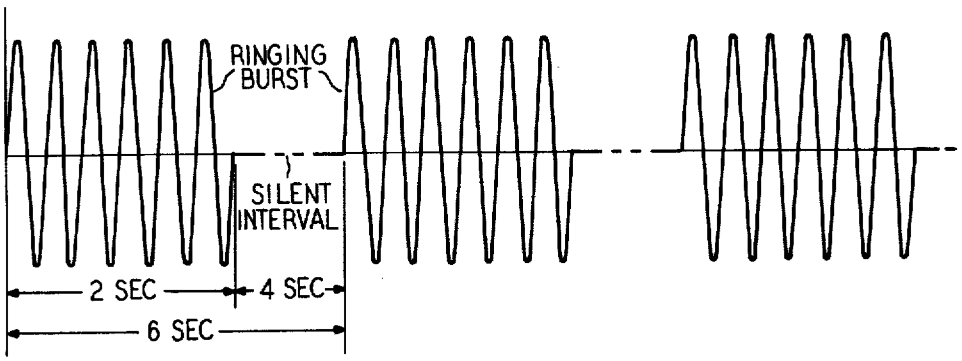
FIG. 2 shows a ringing signal waveform.

The response of the coupler circuit to ringing signals received from the telephone line will now be described in detail. Assume that ringing signals (see FIG. 2) are transmitted over the telephone line and applied to terminals 1 and 2. The ringing signals are coupled through resistors 3, 18, and 19, and capacitor 4, and applied across nodes 51 and 52. The ringing signals present on nodes 51 and 52 are full-wave rectified by diodes 6, 7, 17, and 20, resulting in a positive d.c. potential between node 49 (positive) and node 50 (negative). The value of this d.c. potential is limited to approximately 40 volts by zener diode 15. The d.c. potential causes current flow through capacitor 11, charging this capacitor, through resistors 12 and 13 and to the base of transistor 10 which forward biases this transistor. Transistor 10 turns ON, allowing current to flow through the coil of relay RD and through transistor 10. In response thereto, relay RD operates.

Capacitor 11 continues to charge throughout the ringing burst (see FIG. 2) supplying base current to transistor 10. At the conclusion of the ringing burst, a silent interval begins and capacitor 11 discharges through resistors 16, 13, and 12. A subsequent ringing burst causes the aforementioned sequence to be repeated.

The operation of relay RD closes relay contacts RD-1 and RD-3 and opens contact RD-2. This applies the ringing signals to the primary of transformer $T_1$ and also removes surge limiter 21 and varistors 22 and 23 from across the primary of transformer $T_1$. Removing surge limiter 21 and varistors 22 and 23 from the circuit, removes all metallic a.c. hazardous voltage protection from between the telephone line and the station equipment. The ringing signals are thereby coupled unattenuated through transformer $T_1$ and applied to terminals 44 and 47.

One half cycle of the ringing signal causes current to flow from terminal 44 through the upper half of the secondary of transformer $T_1$, diode 25, relay coil OH, diode 29, capacitor 37, the lower half of the secondary of transformer $T_1$, terminal 47, the station equipment's a.c. load and back to terminal 44. The other half cycle of the ringing signal causes current to flow from terminal 44 through the station equipment's a.c. load back through terminal 47, through the lower half of the secondary of transformer $T_1$ through capacitor 42, transistor 34 (base-emitter junction), transistor 31, diode 27, the winding of relay OH, diode 26, the upper half of the secondary of transformer $T_1$ and back to terminal 44. The value of this current flow at ringing signal voltage amplitude is limited to a maximum of 14 milliamps (RMS at 20 Hz) by capacitor 4, regardless of the station equipment's a.c. load. This current flow charges capacitor 37 to a maximum value of 28 volts which is limited by zener diode 36. The station equipment advantageously detects the ringing signals and in response thereto goes off-hook by applying a d.c. load of approximately 175 ohms across terminals 44 and 47. (If the customer equipment fails to go off-hook, no further action will occur.) D.C. current will then flow from charged capacitor 37 through the base-emitter junction of transistor 31, diode 27, the coil of relay OH, diode 26, the secondary of transformer $T_1$, terminal 44, the station equipment's d.c. load, terminal 47, and the secondary of transformer $T_1$ back to capacitor 37. In response thereto, transistor 31 begins to turn ON, drawing d.c. current through resistor 32. The resultant potential across resistor 32 forward biases the base-emitter junction of transistor 34, turning this transistor ON. Current then flows through transistor 34, resistor 35, and to the base of transistor 31, thereby fully turning transistor 31 ON. (Both transistors 31 and 34 are now locked in the ON state and will remain so until the customer equipment goes on-hook.) D.C. current flows from node 48, through resistor 32, transistor 31, diode 27, the coil of relay OH, diode 26, the upper half of the secondary of transformer $T_1$, terminal 44, the customer's d.c. load, terminal 47, the lower half of the secondary of transformer $T_1$ and back to node 48. This current is of sufficient magnitude to operate relay OH which has an operate current of approximately 20 milliamps.

The operation of relay OH accomplishes two things. Relay contacts Oh-2 and OH-3 are closed, providing a d.c. path from terminal 1 through resistor 3, the primary of transformer $T_1$, resistor 18, and back through terminal 2. This draws d.c. current from the telephone line signaling an off-hook condition to the telephone central office. In response thereto, the telephone central office terminates the ringing signals, thereby permitting capacitor 11 to discharge. Relay contact OH-1 also closes at this time which shunts current away from the base of transistor 10, turning this transistor OFF. This causes relay RD to release, opening relay contacts RD-1 and RD-3 and closing relay contact RD-2. Opening relay contacts RD-1 and RD-3 leaves relay contact OH-2 and OH-3 as the only path for current to flow between the primary of transformer $T_1$ and the telephone line. Closing relay contact RD-2 reconnects surge limiter 21 and varistors 22 and 23 across the primary of transformer $T_1$ thereby restoring the hazardous voltage protection between the telephone line and the station equipment. Voice frequency signals can now be transmitted between the central office and the station equipment.

At the conclusion of the calling sequence, the station equipment goes on-hook, thereby removing the d.c. load from terminals 44 and 47. Current flow through resistor 32 therefore ceases which turns transistor 34 OFF, which, in turn, turns transistor 31 OFF. This causes relay OH to release, opening relay contacts OH-1, OH-2, and OH-3. Capacitor 37 then discharges through resistor 30. The coupler circuit is thereby restored to its standby condition.

In summary, relay RD is operated in response to the application of ringing signals to terminals 1 and 2. The protection against hazardous a.c. metallic voltages is thereupon removed and the ringing signals are applied to terminals 44 and 47. The station equipment goes offhook and applies a d.c. load to terminals 44 and 47. In response thereto, relay OH operates, dropping out relay RD, which reinstates the hazardous voltage protection. The operation of relay OH also signals an off-hook state to the telephone central office. At the conclusion of the call, the coupler circuit resets for subsequent operations.

The response of the coupler circuit to hazardous metallic a.c. voltages originating from the telephone line will now be described in detail. In the instant embodiment, a metallic a.c. hazardous voltage is defined as any continuous voltage of sufficient amplitude to operate the RD relay. A hazardous a.c. voltage applied to terminals 1 and 2 is full-wave rectified by diodes 6, 7, 17, and 20 and amplitude limited by zener diode 15. The resulting rectified and limited voltage applied to nodes 49 and 50 causes capacitor 11 to charge. The charging current flowing through resistor 12 turns transistor 10 ON, which operates relay RD as described above. The operation of relay RD applies the hazardous voltage to the primary of transformer $T_1$ and removes surge protector 21 and varistors 22 and 23 from the circuit. The hazardous voltage is thereupon applied unattenuated to terminals 44 and 47.

As described above, a hazardous voltage originating from the telephone line is a continuous signal and thus will have no silent intervals as are present in the ringing signals. Therefore, capacitor 11 will continue to charge, becoming fully charged in approximately 2 to 8 seconds. When capacitor 11 becomes fully charged, the current through resistor 12 to the base of transistor 10 falls below the current required to maintain transistor 10 in the ON state, and transistor 10 turns OFF, thereby releasing relay RD. Releasing relay RD reconnects surge limiter 21 and varistors 22 and 23 across the primary of transformer $T_1$. This limits the hazardous voltage applied to terminals 44 and 47 to a maximum of 16 volts RMS. Therefore, hazardous voltages appearing across terminals 1 and 2 will only be applied to terminals 44 and 47 for a maximum interval of 8 seconds after which time they will be limited to a safe level.

The coupler circuit also advantageously provides for the immediate limiting (i.e., without the 8 second delay) of hazardous voltages applied to terminals 1 and 2 if the a.c. load connected to terminals 44 and 47 draws more than 20 milliamps RMS of current. The a.c. hazardous voltage will be coupled through to terminals 44 and 47 when the hazardous voltage protection is removed, as described above. One half cycle of the hazardous voltage will cause current to flow from terminal 44, through the upper half of the secondary of transformer $T_1$, diode 25, the coil of relay OH, diode 29, capacitor 37, the lower half of the secondary of transformer $T_1$, terminal 47, and the station equipment's a.c. load, back to terminal 44. The other half cycle of the hazardous voltage causes current to flow from terminal 44 through the a.c. load, through terminal 47, the lower half of the secondary of transformer $T_1$, capacitor 42, transistors 34 and 31, diode 27, relay coil OH, diode 26 and the upper half of the secondary of transformer $T_1$ back to terminal 44. The operate current of relay OH is 20 milliamps. Therefore, if the current flow through the a.c. load is greater than 20 milliamps RMS, relay OH will operate. The operation of relay OH closes relay contact OH-1 which causes relay RD to release, as previously described, and also causes capacitor 11 to become fully charged. When relay RD releases, surge limiter 21 and varistors 22 and 23 are again connected across the primary of $T_1$ thereby limiting the hazardous voltage that is applied to terminals 44 and 47 to a safe level.

Reducing the level of the hazardous voltage previously applied to terminals 44 and 47 causes relay OH to release. (The operation of relay OH signaled an off-hook condition to the telephone central office. As relay OH is almost immediately released, however, this off-hook signal has no effect.) When OH releases, relay contacts OH-2 and OH-3 open, removing the hazardous voltage from the primary of transformer $T_1$. As long as the hazardous voltage continues to be sustained across terminals 1 and 2, relays OH and RD will remain released to provide a protective barrier between the telephone line and the station equipment. When the hazardous voltage is removed, capacitor 11 will discharge through resistors 16, 12, and 13, thereby preparing the circuit for subsequent operations.

In summary, a.c. hazardous voltages applied to terminals 1 and 2 causes relay RD to operate, thereby removing the hazardous voltage protection and applying the hazardous voltage to terminals 44 and 47. Within 8 seconds, however, capacitor 11 will fully charge turning transistor 10 OFF, thereby dropping out relay RD. This reinstates the hazardous voltage protection across transformer $T_1$, thus limiting the hazardous voltage across terminals 44 and 47 to a safe level. Alternatively, a hazardous voltage coupled through to terminals 44 and 47, which causes the a.c. load connected to 44 and 47 to draw more than 20 milliamps RMS of current, will cause relay OH to operate. This drops out relay RD and restores the hazardous voltage protection.

The response of the coupler circuit to station generated hazardous voltages will now be described in detail. In the instant embodiment a station generated hazardous a.c. voltage is defined as any a.c. voltage applied to terminals 44 and 47 of sufficient amplitude to operate relay OH. Assume, for example, that there are no ringing signals applied to terminals 1 and 2, and an a.c. hazardous voltage is applied to terminals 44 and 47. The station generated hazardous a.c. voltage on terminals 44 and 47 will be full-wave rectified by diodes 25, 26, 27, and 29, resulting in a d.c. potential across the coil of relay OH. If the hazardous a.c. voltage exceeds approximately 25 volts RMS, sufficient current will flow through the relay coil to cause relay OH to operate. Relay contacts OH-1, OH-2, and OH-3 are thereby closed. Closing relay contacts OH-2 and OH-3 couples the a.c. voltage present between terminals 44 and 47 through transformer $T_1$ to terminals 1 and 2. Closing relay contact OH-1 ensures that relay RD will remain released, as described above. With relay RD released, surge protector 21 and varistors 22 and 23 are connected across the primary of transformer $T_1$. Therefore all voltages coupled through transformer $T_1$ to terminals 1 and 2 are limited to a nonhazardous 16 volts peak-to-peak ensuring the protection of the telephone line from the station generated hazardous a.c. voltages. As long as the a.c. hazardous voltage remains applied between terminals 44 and 47, relay RD is prevented from operating due to the operated condition of relay OH. Therefore, the protective barrier will be maintained between the telephone line and the station equipment. The operation of relay OH in response to the station generated hazardous voltages signals an off-hook condition to the telephone central office as described above. This off-hook condition will remain as long as the station generated hazardous voltages are present.

Assume now for example that ringing signals are applied to terminals 1 and 2, removing the hazardous voltage protection as described above. Assume also that due to a station equipment malfunction, the station equipment does not go off-hook in response to the ringing but rather applies a hazardous a.c. voltage to terminals 44 and 47. As relay RD is operated, the hazardous voltage protection is removed from the circuit and in the prior art, this hazardous a.c. voltage would be connected directly to the telephone line. However, the hazardous a.c. voltage on terminals 44 and 47 advantageously causes the operation of relay OH as described above. This closes relay contact OH-1, turning transistor 10 OFF, and releasing relay RD which replaces surge limiter 21 and varistors 22 and 23 across the primary of transformer $T_1$. This limits the hazardous voltage to 16 volts peak-to-peak, thereby protecting the telephone line from the station generated hazardous voltages in the presence of ringing signals.

In summary, station generated hazardous a.c. voltages cause the operation of relay OH. This prevents the operation of relay RD (or causes relay RD to release) which, in turn, ensures that the protective barrier is maintained (or reinstated) between the customer terminals and the telephone line to the central office.

The coupler circuit in FIG. 1 detects an off-hook condition of the station equipment and in response thereto signals an off-hook condition to the telephone central office as described above. The coupler circuit is advantageously rendered unresponsive to the off-hook condition of the station equipment in the absence of ringing signals on the telephone line. This is accomplished as follows. Assume, for example, ringing is present on terminals 1 and 2 and has been applied to terminals 44 and 47 as described above. In response thereto capacitor 37 will charge applying a d.c. potential to terminals 44 and 47. Assume now that the station equipment does not immediately go off-hook in response to the ringing signals and the ringing signals cease. Capacitor 37 will then immediately begin to discharge through resistor 30 and will be essentially fully discharged in approximately 30 seconds. If the station equipment goes off-hook due to internal malfunctions subsequent to the discharge of capacitor 37, it will not draw current through the base of transistor 31 as described above. Therefore relay OH is prevented from operating and the coupler circuit is rendered unresponsive to the off-hook condition of the station equipment and will remain unresponsive in the absence of ringing signals on the telephone line. This feature prevents the coupling circuit from signaling an off-hook condition to the telephone central office in response to an erroneous off-hook state in the station equipment.

Although a specific embodiment of this invention has been shown and described, it will be understood that various modifications may be made without departing from the spirit of the invention.

We claim:

1. A circuit for providing a two-way signaling path between a telephone line and station equipment including means for limiting the amplitude of signals on the signaling path to provide hazardous voltage protection, and means responsive to ringing signals from the telephone line for disabling the limiting means, characterized in that the circuit further includes, means responsive to the presence of station generated signals exceeding a predetermined amplitude for preventing the disabling of the limiting means.

2. A circuit in accordance with claim 1 wherein the preventing means further includes means responsive to the occurrence of station generated signals exceeding the predetermined amplitude subsequent to the disabling of the limiting means for reenabling the limiting means.

3. A circuit in accordance with claim 1 wherein there is further included means operative subsequent to the disabling of the limiting means and responsive to the continuous presence of signals on the telephone line at least equal in amplitude to the amplitude of the ringing signals for reenabling the limiting means in a predetermined interval of time.

4. A circuit in accordance with claim 1 wherein there is further included means operative upon the application to the station equipment of a voltage signal greater in amplitude than the amplitude of the ringing signals and responsive to a predetermined amount of current drawn by the station equipment in response to the voltage signal applied thereto for reenabling the limiting means.

5. A circuit for normally inserting a voltage limiting device between a telephone line and a remote station to provide hazardous voltage protection including means for removing the voltage limiting device in response to ringing signals received from the telephone line, characterized in that the circuit further includes, means responsive to continuous signals on the telephone line at least equal in amplitude to the amplitude of the ringing signals and continuous for a predetermined interval of time for reinserting the voltage limiting device.

6. A circuit in accordance with claim 5 wherein there is further included means responsive to remote station generated signals exceeding a predetermined amplitude for preventing the removal of the voltage limiting device.

7. A circuit in accordance with claim 6 wherein there is further included means responsive to the occurrence of remote station generated signals exceeding the predetermined amplitude subsequent to the removal of the voltage limiting device for disabling the removing means.

8. A circuit for connecting station equipment to a telephone line including means for limiting the amplitude of signals applied to the station equipment and means responsive to ringing signals on the telephone line for removing the limiting means, characterized in that the circuit further includes, means responsive to the application of a voltage signal to the station equipment greater in amplitude than the amplitude of the ringing signals for detecting a predetermined amount of current drawn by the station equipment, and means responsive to the detecting means for reinstating the limiting means.

9. A circuit in accordance with claim 8 further including means responsive to continuous signals on the telephone line at least equal in amplitude to the amplitude of the ringing signals for enabling the reinstating means in a predetermined interval of time.

10. A circuit in accordance with claim 8 wherein there is further included means responsive to station generated signals exceeding a predetermined amplitude for preventing the removal of the limiting means.

11. A circuit for connecting a telephone line to a remote station including means responsive to the remote station going off-hook for signaling the occurrence of the off-hook condition via the telephone line to a telephone central office, characterized in that, the circuit further includes, means for detecting the absence of ringing signals on the telephone line, and means responsive to the detecting means for rendering the signaling means unresponsive to the remote station going off-hook.

12. A circuit in accordance with claim 11 wherein the detecting means includes means for charging a capacitor in response to the presence of ringing signals on the telephone line and means for discharging the capacitor in response to the absence of ringing signals on the telephone line, the rendering means being operative in response to the discharge of the capacitor to a predetermined level.

13. A method for protecting a telephone line from voltages generated by station equipment connected to the telephone line, comprising the steps of, normally inserting a voltage limiting device between the telephone line and the station equipment, removing the voltage limiting device in response to ringing signals on the telephone line, reinserting the voltage limiting device in response to station generated voltages exceeding a predetermined amplitude.

14. A method for protecting station equipment from voltages originating from a telephone line connected to the station equipment, comprising the steps of, normally inserting a voltage limiting device between the telephone line and the station equipment, removing the voltage limiting device in response to ringing signals on the telephone line, reinserting the voltage limiting device in response to the continuous presence of voltages on the telephone line exceeding a predetermined amplitude.

* * * * *